(12) United States Patent
Yin et al.

(10) Patent No.: US 12,504,520 B2
(45) Date of Patent: Dec. 23, 2025

(54) APPARATUS, PROCESSING CIRCUITRY AND METHOD FOR MEASURING DISTANCE FROM DIRECT TIME OF FLIGHT SENSOR ARRAY TO AN OBJECT

(71) Applicant: Taiwan Semiconductor Manufacturing Company, Ltd., Hsinchu (TW)

(72) Inventors: Chin Yin, Tainan (TW); Shang-Fu Yeh, Hsinchu (TW); Chiao-Yi Huang, Hsinchu County (TW); Chih-Lin Lee, Miaoli County (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 903 days.

(21) Appl. No.: 17/737,030

(22) Filed: May 5, 2022

(65) Prior Publication Data

US 2023/0358864 A1 Nov. 9, 2023

(51) Int. Cl.
| | |
|---|---|
| G01S 7/4865 | (2020.01) |
| G01B 11/22 | (2006.01) |
| G01S 7/481 | (2006.01) |
| G01S 7/4863 | (2020.01) |
| G01S 17/894 | (2020.01) |

(52) U.S. Cl.
CPC ............ *G01S 7/4865* (2013.01); *G01B 11/22* (2013.01); *G01S 7/4816* (2013.01); *G01S 7/4863* (2013.01); *G01S 17/894* (2020.01)

(58) Field of Classification Search
CPC .... G01S 7/4865; G01S 17/894; G01S 7/4816; G01S 7/4836; G01B 11/22
See application file for complete search history.

(56) References Cited

U.S. PATENT DOCUMENTS

| | | | | |
|---|---|---|---|---|
| 8,723,093 | B2 * | 5/2014 | Krymski | H10F 39/186 |
| | | | | 257/E27.131 |
| 2008/0258042 | A1 * | 10/2008 | Krymski | H04N 25/767 |
| | | | | 348/E3.018 |
| 2013/0300838 | A1 * | 11/2013 | Borowski | H04N 25/00 |
| | | | | 348/46 |
| 2016/0295205 | A1 * | 10/2016 | Lim | H04N 17/002 |
| 2017/0097417 | A1 * | 4/2017 | Wang | H03K 3/0372 |

* cited by examiner

*Primary Examiner* — Luke D Ratcliffe
*Assistant Examiner* — Benjamin Wade Clouser
(74) *Attorney, Agent, or Firm* — JCIPRNET (57) ABSTRACT

An apparatus, a processing circuitry and a method for measuring a distance to an object are provided. The apparatus comprising a light source, a direct time of flight (DTOF) sensor array configured to receive a reflected signal from the object, a processing circuitry coupled to the DTOF sensor array and comprising a first time to digital converter (TDC) and a second TDC, respectively disposed on opposite sides of the DTOF sensor array, the processing circuitry configured to receive, by the first TDC, a first photon detection signal transmitted by a first pixel, receive, by the second TDC, a second photon detection signal transmitted by the first pixel, and calculate a first distance from the first pixel to the object according to a first arrival time of the first photon detection signal detected by the first TDC and a second arrival time of the second signal detected by the second TDC.

20 Claims, 9 Drawing Sheets

APPARATUS, PROCESSING CIRCUITRY AND METHOD FOR MEASURING DISTANCE FROM DIRECT TIME OF FLIGHT SENSOR ARRAY TO AN OBJECT

BACKGROUND

Ranging sensors capable of three dimensional environment sensing are used in a variety of applications such as autonomous driving, medicine, robotic vision, security, etc. In some application, a direct time-of flight (DTOF) method is utilized for calculating the distance by measuring the total flight time of the emitted light. In such applications, precision on measuring the flight time is required to be high, since transmission delays in the logic circuits may contribute relatively large error to the measured distance results.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
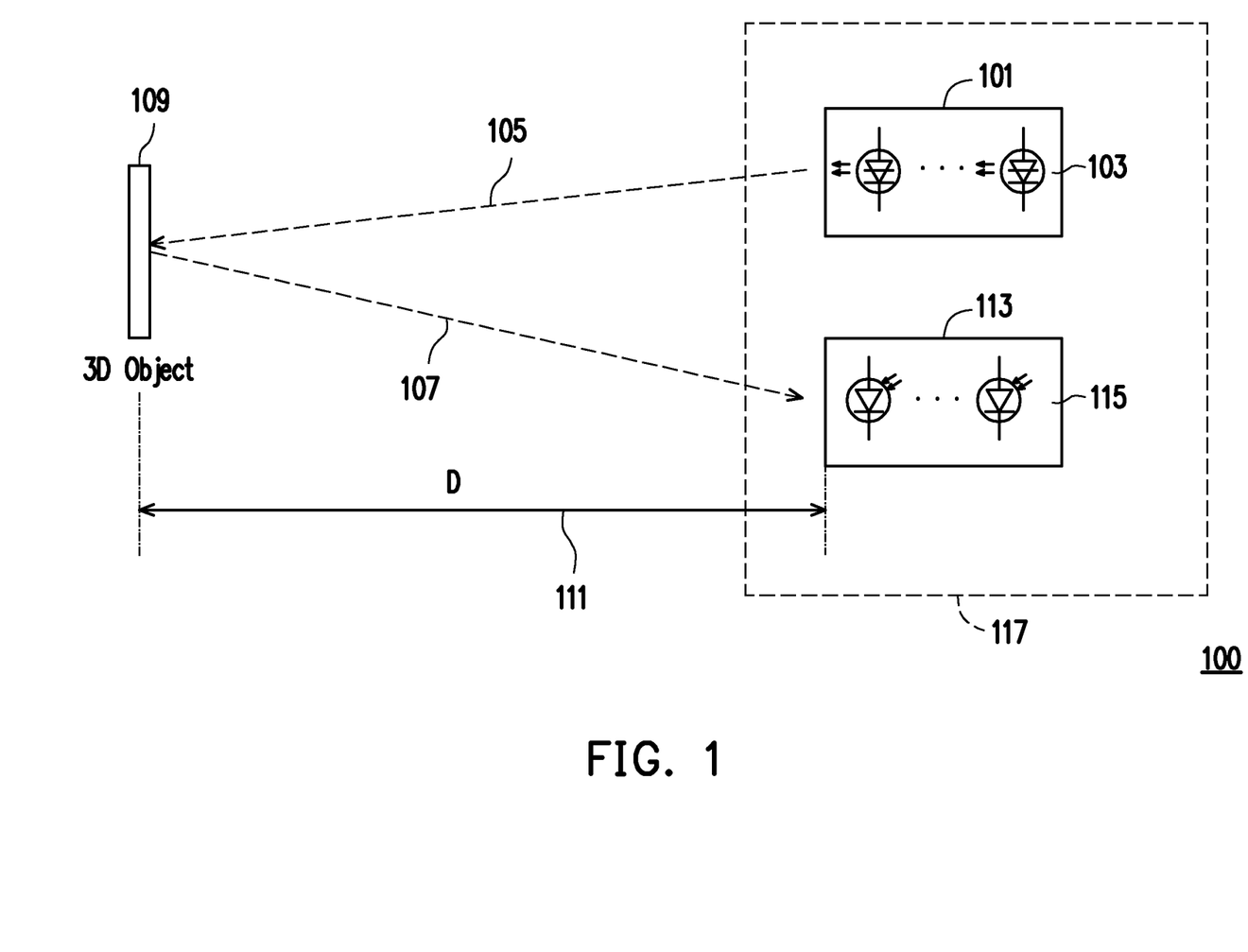
FIG. 1 illustrates a block diagram of a 3-D range sensing system with a pulse modulated light source and DTOF sensor array in accordance with some embodiments of the present disclosure.

FIG. 1 illustrates a 3-D range sensing system 100 that measures a distance 111 from a DTOF sensor 117 to a 3D object 109. In one embodiment, a light source 101 emits a modulated signal 105 towards the 3D object 109. In some embodiment, the light source 101 may include an array of Light-Emitting Diodes (LEDs) or solid-state lasers 103 such as Vertical-Cavity surface-emitting lasers (VCSEL) with wavelengths in the range of 850 nanometers (nm)-870 nm. In some embodiments, the modulated signal 105 may be a square wave or a continuous-wave such as a sinusoid. In some embodiments, the modulated signal 105 may be periodically generated with a predetermined periodicity. In another embodiment, the modulated signal 105 may be generated using digital circuitry including ring oscillators and counters.

A reflected signal 111 is reflected from the 3D object 109 and detected by a DTOF sensor array system 115. In some embodiments, the DTOF sensor array system 115 may include a 2-dimensional array of light receivers 113. In some embodiment, the DTOF sensor array system 115 may be implemented by SPAD light receivers. As illustrated in FIG. 1, the DTOF sensor 117 operates by measuring a roundtrip travel time $T_d$ of photons emitted from the light source 101 and captured by the sensor array 115 system. The roundtrip travel time of photons carried in the modulated signal 105 and the reflected signal 107 is determined by measuring the phase delay of the reflected signal 107 from the modulated signal 105. The distance D 111 is then determined by $$D = \frac{1}{2}cT_d,$$

where c is the speed of light in a material medium in which the 3D Object 109 and the DTOF sensor 117 are located, and $T_d$ is the roundtrip travel time of photons emitted from the light source 101 and captured by the sensor array system 115.

Figure 2A:
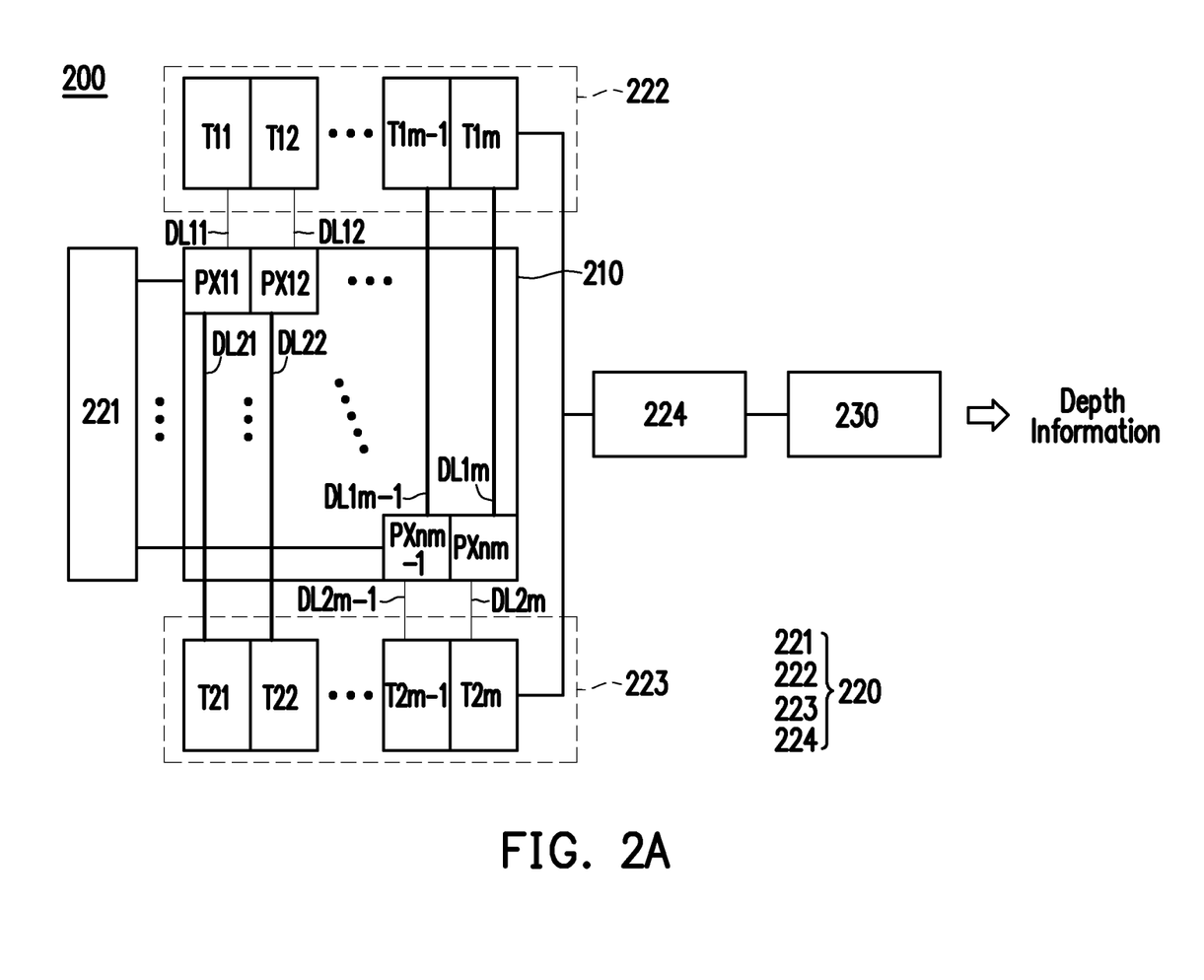
FIG. 2A illustrates a block diagram of a DTOF sensor array system in accordance with some embodiments of the present disclosure.

FIG. 2A illustrates a block diagram of a DTOF sensor array system 200 in accordance with some embodiments of the present disclosure. The DTOF sensor array system 200 includes a DTOF sensor array 210, a processing circuitry 220 and a histogramming circuit 230. The DTOF sensor array system 200 may be configured to sense a reflected signal from an object and a roundtrip delay between emission of the light source 101 as illustrated in FIG. 1 and the reflected signal to the DTOF sensor array system 200 may be calculated. As such, the distance between the object and the DTOF sensor array system 200 may be determined based on the roundtrip delay.

The DTOF sensor array 210 comprises a plurality of single-photon avalanche diodes (SPADs) disposed in a plurality of pixels PX11-PXnm. In some embodiments, the DTOF sensor array 210 comprises a pixel array with size n rows and m columns, and at least one SPAD is disposed in each pixel. The SPAD is reverse biased at into its avalanche region. Incoming photons generate charge carriers that induce avalanche current. Thus, each pixel may provide current as a photon detection signal to the coupled data lines upon detection of the reflected signal from the object.

Figure 2B:
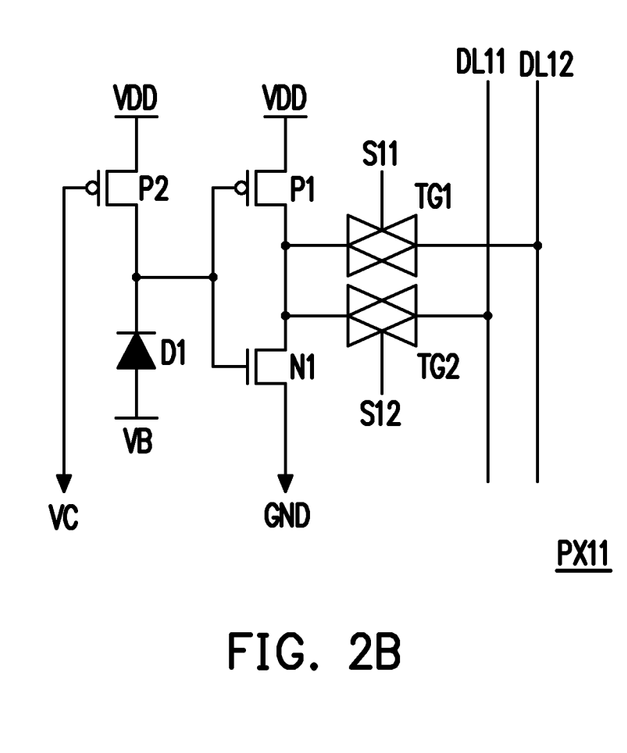
FIG. 2B illustrates a circuit diagram of a pixel in accordance with some embodiments of the present disclosure.

FIG. 2B illustrates a circuit diagram of a pixel PX11 in accordance with some embodiments of the present disclosure. As illustrated in FIG. 2B, the pixel comprises a SPAD D1, transistors P1, P2, N1, and transmission gates TG1, TG2.

The SPAD D1 and the transistors are serially connected between an operating voltage VDD and a biased voltage VB. The SPAD D1 is configured to generate a current when incoming upon detection of photons. An inverter is formed by the transistors P1, N1 driven by the, operating voltage VDD and a ground voltage GND, configured to buffer out the detection signal in response to the breakdown current generated by the SPAD D1. Specifically, upon incoming of photons, the SPAD D1 generates avalanche current to pull down the voltage on the node between the transistor and the SPAD D1. Driven by the pulled down voltage, the inverter may generate a logic high voltage at its output end. The transmission gates TG1, TG2 may selectively provide the detection signal to the data lines DL11, DL12 based on control signals S11, S12 generated from the row selector 221.

The processing circuitry 220 is coupled to the DTOF sensor array 210. The processing circuitry 220 is configured to control operations of the DTOF sensor array 210 and receive the current generated by each pixel (i.e. photon detection signal). The processing circuitry 220 calculates the distance to the object based on when the photon detection signals are received by the processing circuitry 220. Specifically, the processing circuitry 220 comprises a row selector 221, time to digital converter (TDC) blocks 222, 223, and a computing circuit 224.

The row selector 221 is coupled to each row of the DTOF sensor array 210 to control operations of each row of the DTOF sensor array 210. Although it is not illustrated in FIG. 2A, each pixel is coupled to the data line through a switch. The row selector 221 is configured to provide control signals to the DTOF sensor array 210, so each row of the DTOF sensor array 210 is enabled sequentially.

The TDC blocks 222, 223 are coupled to the DTOF sensor array 210. The TDC blocks 222, 223 are disposed on opposite sides of the DTOF sensor array 210. The TDC blocks 222, 223 each comprises a plurality of TDCs. The TDC block 222 comprises TDCs T11-T1m, and each TDC corresponds to each column of the DTOF sensor array 210. Similarly, the TDC block 223 comprises TDCs T21-T2m, and each of the TDCs T21-T2m corresponds to each column of the DTOF sensor array 210. The TDCs T11-T1m are disposed above the DTOF sensor array 210, and along a row direction of the DTOF sensor array 210. The TDCs T21-T2m are disposed under the DTOF sensor array 210. Therefore, each pixel in the DTOF sensor array 210 is coupled to two TDCs, where one in the TDC block 222 on top and another one in the TDC block 223 on bottom.

Although it is not clearly illustrated in FIG. 2A, the TDC block 222 is coupled to the pixels in the DTOF sensor array 210 through data lines DL11-DL1m. For example, all pixels PX11-PXn1 in the first column are coupled to the data lines DL11 and DL21, wherein the data line DL11 provide connections for the pixels PX11-PXn1 in the first column to the TDC T11 and the data line DL21 provide connections for the pixels PX11-PXn1 in the first column to the TDC T21. In some embodiments, a switch controlled by the row selector 221 is coupled between each pixel and the data line for controlling a signal path of each pixel.

The TDC is configured to receive the photon detection signal from the coupled pixel. More particularly, the TDC is configured to take arrival time of the photon detection signal to calculate the roundtrip delay of the light emitted from the light source and reflected by the object. The photon detection signal of a single pixel is provided to both TDCs in the TDC blocks 222, 223 for measuring the roundtrip delay twice.

Taking the pixel PX11 as an example, the SPAD inside the pixel PX11 generates avalanche voltage pulse onto the data lines DL11, DL21 upon incoming of photons. The pixel PX11 may provide the voltage pulse to both of the data lines DL11, DL21 in the same frame period, or provide the voltage pulse to the data lines DL11. DL21 in different frame periods respectively. When the TDC T11 receives a voltage pulse triggering signal, it may be determined that a photon detection event is sensed by the PX11, and the voltage pulse provided by the pixel T11 may be taken as the photon detection signal by the TDC T11. In response to receiving the photon detection signal, the TDC T11 calculates a first time difference between an emission time of the light source to emit the modulated signal and a first arrival time of the TDC T11 to receive the photon detection signal. Similarly, the TDC T21 calculates a second time difference between an emission time of the light source to emit the modulated signal and a second arrival time of the TDC T21 to receive the photon detection signal.

Since the TDC T11 uses the first arrival time of the photon detection signal to receive the TDC T11 to calculate the first time difference, the first time difference includes not only the roundtrip delay of the photons, but also the propagation delay of the photon detection signal from the PX11 to the TDC T11 through the data line DL11. Therefore, the time difference calculated by the TDC blocks 222 or 223 are intrinsically biased based on where they are disposed. More particularly, lengths of the signal paths between the TDC block 222 to the pixels increase in accordance with the row order, wherein the TDC block 222 has the shortest signal path to the pixels PX11-PX1m on the first row, and has the longest signal path to the pixels PXn1-PXnm on the last row. Such inconsistency on signal paths have also influenced on arrival times received from the pixels, wherein the first arrival times received from the pixels PX11-PX1m on the first row have the least biased offset, and the first arrival times received from the pixels PXn1-PXnm on the last row have the greatest biased offset. Since the arrival times of the photon detection signal to the TDC block 222 are unequally biased, if distance of the object to each pixel is determined merely based on the sensing results obtained by the TDC block 222, sensed distances corresponding the pixels are also unequally biased. Sensed distances of the object to the pixels PX11-PX1m on the first row has the least offset, and sensed distance of the object to the pixels PXn1-PXnm on the last row has the greatest offset, since the TDC block 222 is disposed on top of the DTOF sensor array 210. In another aspect, distances sensed by the TDC block 223 have the offset distribution contrary to that sensed by the TDC block 222, wherein sensed distances of pixels PX11-PX1m on the first row has the greatest offset, and sensed distances of pixels PXn1-PXnm on the last row has the least offset since the TDC block 223 is disposed on bottom of the DTOF sensor array 210.

Figure 2C:
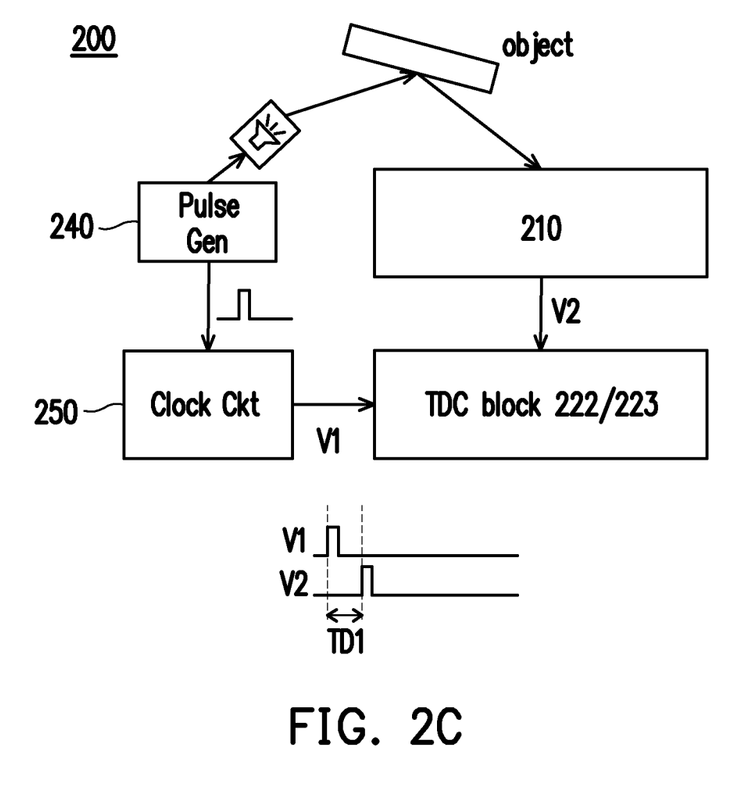
FIG. 2C illustrates on a block diagram of a DTOF sensor array system in accordance with some embodiments of the present disclosure.

FIG. 2C illustrates on a block diagram of a DTOF sensor array system 200 in accordance with some embodiments of the present disclosure. The DTOF sensor array system 200 further comprises a pulse generator 240 and a clock circuit 250. The pulse generator 240 is configured to provide a starting pulse V1 to the light source 101 as illustrated in FIG. 1 for generating the modulated signal 105. The starting pulse V1 is provided to the TDC blocks 222/223 through operations of the clock circuit, which may be a phase lock delay loop (PLL) circuit, a delay lock loop circuit, or other suitable circuits. Further, after photons reflected by the object is received by the DTOF sensor array 210, the detection signal V2 is provided to the TDC blocks 222/223 as well. Triggered by the starting pulse V1 and the detection signal V2, the TDC blocks 222/223 may compare the time difference TD1 between the starting pulse V1 and the detection signal V2.

The computing circuit 224 is coupled to the TDC blocks 222, 223. The computing circuit 224 is configured to calculate the distance from each pixel PX11 to the object according to the first time difference and the second difference respectively obtained by the TDC blocks 222, 223. Specifically, the computing circuit 224 is configured to receive a first time difference and a second time difference corresponding to the same pixel, and calculate an average time difference of the first time difference and the second time difference. Since a total length of each data line is constant, lengths of the signal path from each pixel to the respective TDC blocks 222, 223 are complementary, which leads to the offsets in the first time difference and the second time difference to be also complementary. Thus, an offset within the average time difference of the first time difference and the second time difference respectively obtained by the TDC blocks 222, 223 from each pixel is constant.

In some embodiments, the DTOF sensor array system 200 provides depth information by a histogramming circuit 230, which accumulates multiple times distance information of each pixel provided by the computing circuit 224 into a statistical representation to form after multiple times of frame (row) data collection. In some embodiments, the histogram logic circuit 205 may be implemented on-chip or off-chip.

In some embodiments, the average time difference may be directly utilized for calculating the distance of each pixel to the object. It is noted that an offset distribution of the depth image is uniformly distributed since distance of each pixel to the object is calculated through the average time difference. As such, the distance of each pixel to the object comprises the same or approximately the same amount of offset. In some aspect, the depth image obtained through the average time difference of each pixel may reflect relative depth information of the object. For example, when the object is a human face, the obtained depth image may preserve relative depth information to identify identity features, such as the eye, nose, mouse, etc.

In some embodiments, offset may be subtracted from the distance of each pixel to the object. Specifically, offset within the distance of each pixel is related to a total length of the signal path from each pixel to the TDC blocks 222, 223 and may be derived from the offsets of the first arrival time and the second arrival time. Since the total length of the signal path from each pixel to the TDC blocks 222, 223 is approximately the same, an offset within the average time difference is constant or approximately constant. Under such a circumstance, a foreground calibration may be performed to obtain the offset of the average time difference, and thus the computing circuit 224 may be configured to subtract the offset out from the average time difference, and use the subtracted average time difference to calculate the distance of each pixel. Therefore, the depth image obtained by the DTOF sensor array system 200 may accurately record absolute and relative distance information from each pixel to the object.

Figure 3A:
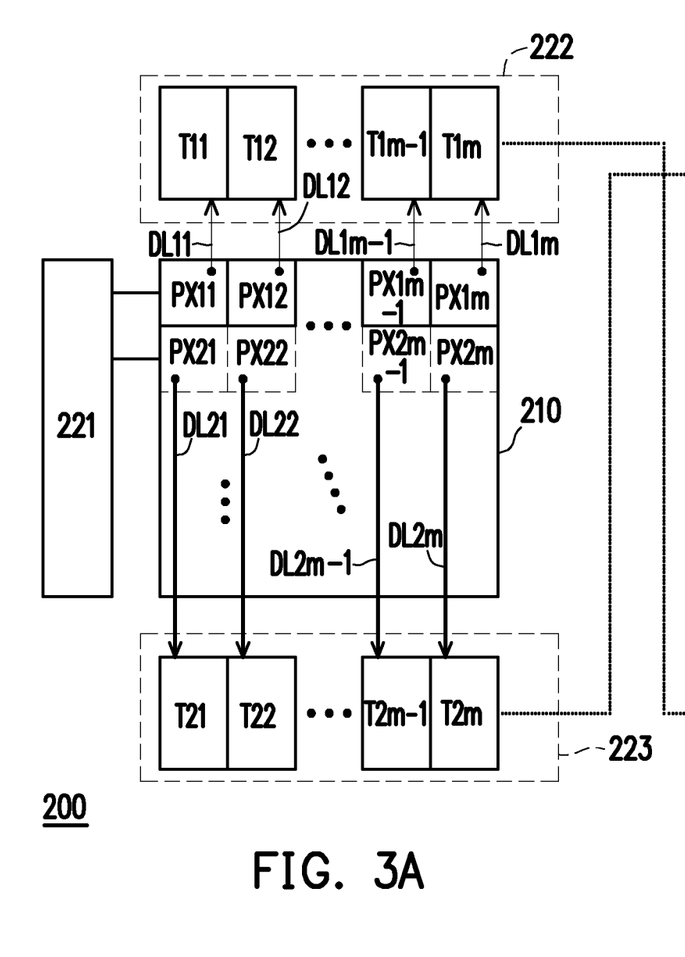
FIG. 3A illustrates a schematic diagram of how the photon detection signals are transmitted from each pixel to the TDC blocks in a frame period in accordance with some embodiments of the present disclosure.

FIG. 3A illustrates a schematic diagram of how the photon detection signals are transmitted from each pixel to the TDC blocks 222, 223 in a frame period Fn in accordance with some embodiments of the present disclosure. Some circuit blocks in the DTOF sensor array system 200, such as the computing circuit 224 and the histogramming circuit 230, are omitted for ease of explanation.

As illustrated in FIG. 3A, the pixels PX11-PX1m in the first row of the DTOF sensor array 210 are controlled by the row selector 221 to provide the photon detection signals to the TDC block 222, and the pixels PX21-PX2m in the second row of the DTOF sensor array 210 are controlled by the row selector 221 to provide the photon detection signals to the TDC block 223. Specifically, the pixels PX11-PX1m in the first row provide the photon detection signals to the TDC block 222 respectively through the data lines DL11-DL1m, and the pixels PX21-PX2m in the second row provide the photon detection signals to the TDC block 223 respectively through the data lines DL21-DL2m.

It is noted each frame period is divided into a plurality of sensing periods. The photon detection signal transmission of the pixels in first and second rows of the DTOF sensor array 210 may be performed in the same or different sensing periods. For example, in some embodiments, transmissions of the photon detection signal from the pixels PX11-PX1m to the TDC block 222 and from the pixels PX21-PX2m to the TDC block 223 may be performed in a same sensing period of the frame period Fn. In some embodiments, transmissions of the photon detection signal from the pixels PX11-PX1m to the TDC block 222 may be performed in the first sensing period and transmissions of the photon detection signals from the pixels PX21-PX2m to the TDC block 223 may be performed in the second sensing period of the frame period Fn.

In brief, after the frame period Fn, the TDC block 222 obtains the first arrival times of the pixels in the odd rows, and the TDC block 223 obtains the second arrival times of the pixels in the even rows.

Figure 3B:
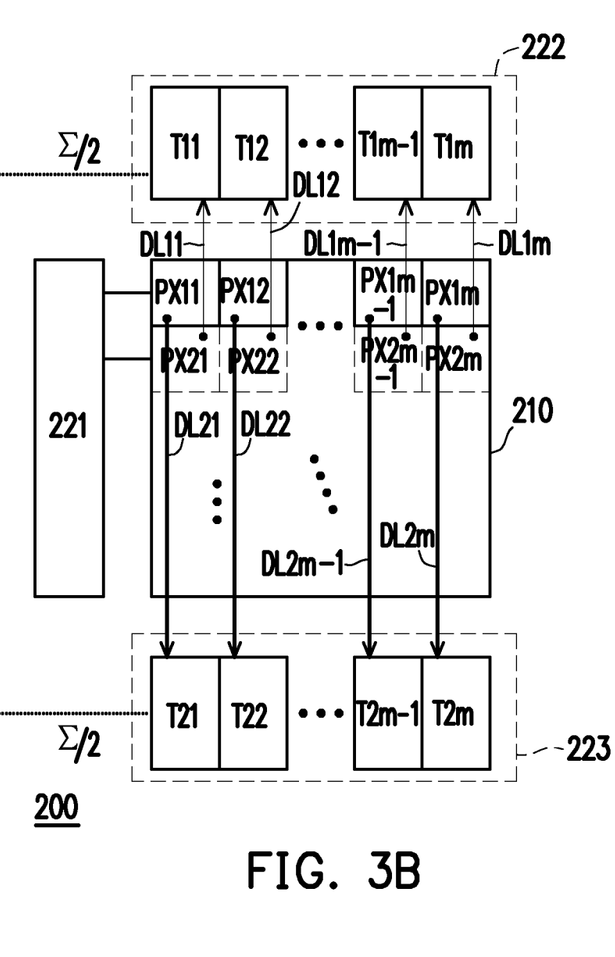
FIG. 3B illustrates a schematic diagram of how the photon detection signals are transmitted from each pixel to the TDC blocks in a frame period in accordance with some embodiments of the present disclosure.

FIG. 3B illustrates a schematic diagram of how the photon detection signals are transmitted from each pixel to the TDC blocks 222, 223 in a frame period Fn+1 in accordance with some embodiments of the present disclosure. Some circuit blocks in the DTOF sensor array system 200, such as the computing circuit 224 and the histogramming circuit 230, are omitted for ease of explanation.

As illustrated in FIG. 3B, the pixels PX11-PX1m in the first row of the DTOF sensor array 210 are controlled by the row selector 221 to provide the photon detection signals to the TDC block 223, and the pixels PX21-PX2m in the second row of the DTOF sensor array 210 are controlled by the row selector 221 to provide the photon detection signals to the TDC block 222. Specifically, the pixels PX11-PX1m in the first row provide the photon detection signals to the TDC block 223 respectively through the data lines DL21-

DL2*m*, and the pixels PX21-PX2*m* in the second row provide the photon detection signals to the TDC block 222 respectively through the data lines DL11-DL1*m*.

Similarly, transmissions of the photon detection signal from the pixels PX11-PX1*m* to the TDC block 223 and from the pixels PX21-PX2*m* to the TDC block 222 may be performed in the same sensing period of the frame period Fn+1. In some embodiments, transmissions of the photon detection signal from the pixels PX11-PX1*m* to the TDC block 223 may be performed in the first sensing period and transmissions of the photon detection signals from the pixels PX21-PX2*m* to the TDC block 222 may be performed in the second sensing period of the frame period Fn+1.

In brief, after the frame period Fn+1, the TDC block 222 obtains the first arrival times of the pixels in the even rows, and the TDC block 223 obtains the second arrival times of the pixels in the odd rows.

Therefore, after the frame periods Fn, Fn+1, the TDC blocks 222, 223 obtains both of the first arrival times and the second arrival times of the photon detection signals from all pixels PX11-PXnm. The computing circuit 224 may calculate an average time difference on each pixel according to the corresponding first and second arrival time. Thus, a distance from each pixel to the object may be calculated by the computing circuit 224, and a depth may be formed by the histogramming circuit 230.

Figure 4A:
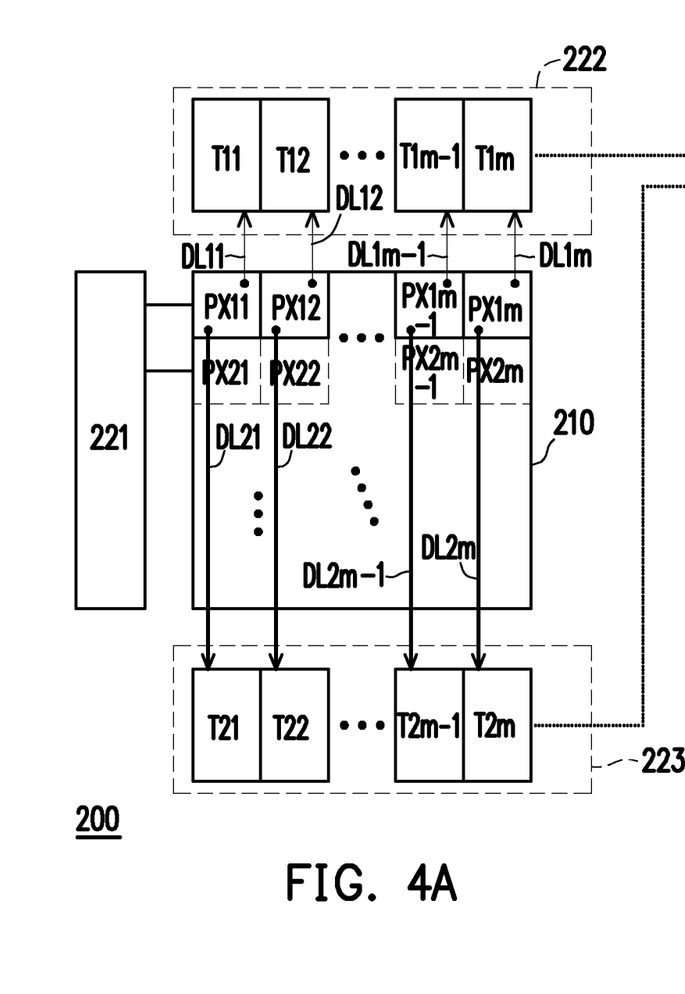
FIGS. 4A and 4B illustrate schematic diagrams of how the photon detection signals are transmitted from each pixel to the TDC blocks in a frame period Fn in accordance with some embodiments of the present disclosure.
Figure 4B:
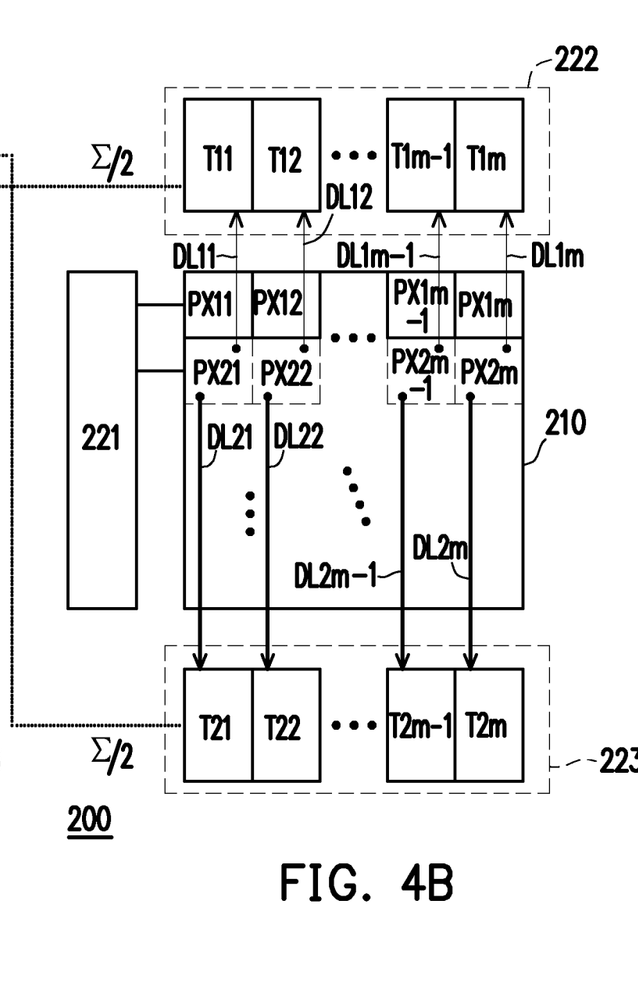

FIGS. 4A and 4B illustrate schematic diagrams of how the photon detection signals are transmitted from each pixel to the TDC blocks 222, 223 in a frame period Fn in accordance with some embodiments of the present disclosure. Some circuit blocks in the DTOF sensor array system 200, such as the computing circuit 224 and the histogramming circuit 230, are omitted for ease of explanation.

As illustrated in FIG. 4A, the pixels PX11-PX1*m* in the first row of the DTOF sensor array 210 are controlled by the row selector 221 to provide the photon detection signals to the both of the TDC blocks 222, 223. The pixels PX11-PX1*m* in the first row provide the photon detection signals to the TDC block 222 respectively through the data lines DL11-DL1*m*, and provide the photon detection signals to the TDC block 223 respectively through the data lines DL21-DL2*m*.

It is noted each frame period is divided into a plurality of sensing periods. The photon detection signal transmission of the pixels in first row of the DTOF sensor array 210 may be performed in the same or different sensing periods. For example, in some embodiments, transmissions of the photon detection signal from the pixels PX11-PX1*m* to the TDC blocks 222, 223 may be performed in a same sensing period of the frame period Fn. In some embodiments, transmissions of the photon detection signal from the pixels PX11-PX1*m* to the TDC block 222 may be performed in a first sensing period and transmissions of the photon detection signals from the pixels PX11-PX1*m* to the TDC block 223 may be performed in a second sensing period of the frame period Fn.

After the first arrival times and the second arrival times of the pixels PX11-PX1*m* are obtained, the DTOF sensor array system 200 moves on to obtain the first arrival times and the second arrival times of the pixels PX21-PX2*m* in the second row.

As illustrated in FIG. 4B, the pixels PX21-PX2*m* in the second row of the DTOF sensor array 210 are controlled by the row selector 221 to provide the photon detection signals to the both of the TDC blocks 222, 223. The pixels PX21-PX2*m* in the second row provide the photon detection signals to the TDC block 222 respectively through the data lines DL11-DL1*m*, and provide the photon detection signals to the TDC block 223 respectively through the data lines DL21-DL2*m*.

Similarly, the photon detection signal transmission of the pixels in first row of the DTOF sensor array 210 may be performed in the same or different sensing periods. For example, in some embodiments, transmissions of the photon detection signal from the pixels PX21-PX2*m* to the TDC blocks 222, 223 may be performed in a same sensing period of the frame period Fn. In some embodiments, transmissions of the photon detection signal from the pixels PX21-PX2*m* to the TDC block 222 may be performed in a first sensing period and transmissions of the photon detection signals from the pixels PX21-PX2*m* to the TDC block 223 may be performed in a second sensing period of the frame period Fn.

Therefore, after the frame period Fn, the TDC blocks 222, 223 obtains both of the first arrival times and the second arrival times of the photon detection signals from all pixels PX11-PXnm. The computing circuit 224 may calculate an average time difference on each pixel according to the corresponding first and second arrival time. Thus, a distance from each pixel to the object may be calculated by the computing circuit 224, and a depth may be formed by the histogramming circuit 230.

FIGS. 5A-5D illustrate schematic diagrams of how the photon detection signals are transmitted from each pixel to the TDC blocks 322, 323 in frame periods Fn-Fn+3 in accordance with some embodiments of the present disclosure. It is noted that a DTOF sensor array system 500 are illustrated in FIGS. 5A-5D. The DTOF sensor array system 500 is similar to the DTOF sensor array system 200 as illustrated in FIG. 2A except that the TDC blocks 222, 223 in the DTOF sensor array system 500 as illustrated in FIG. 5 are replaced by the TDC blocks 522, 523. Although it is not clearly illustrated, each pixel in the DTOF sensor array 210 are coupled to four TDCs through respective four data lines, wherein each pixel is coupled to two TDCs in the TDC block 522 and two TDCs in the TDC block 523. Some circuit components in the DTOF sensor array system 500, such as the computing circuit 224 and the histogramming circuit 230 are omitted for ease of explanation.

Figure 5A:
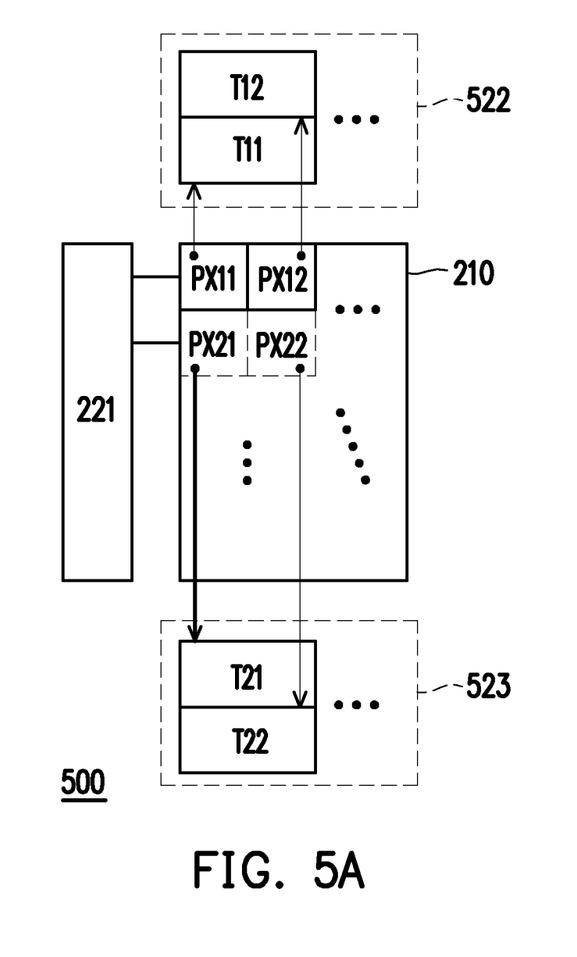
FIGS. 5A-5D illustrate schematic diagrams of how the photon detection signals are transmitted from each pixel to the TDC blocks in frame periods in accordance with some embodiments of the present disclosure.
Figure 5B:
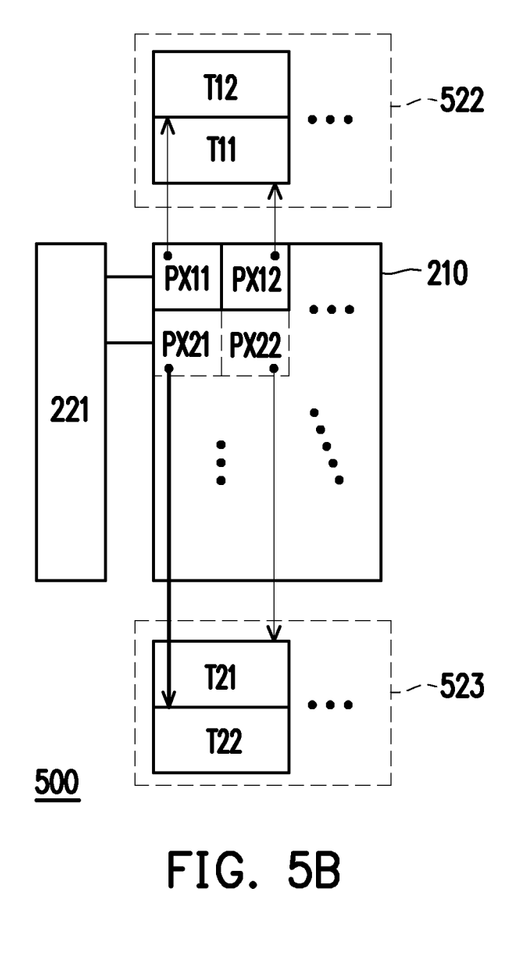

Taking the four pixels PX11, PX12, PX21, PX22 as an example, as illustrated in FIGS. 5A, 5B, pixels PX11, PX12 in the first row are controlled by the row selector 221 to provide the photon detection signal to the TDC block 522, and pixels PX21, PX22 in the second row are controlled by the row selector 221 to provide the photon detection signal to the TDC block 523 in the frame periods Fn, Fn+1. Specifically, as the transmission of photon detection signals in the frame period Fn illustrated in FIG. 5A, the pixels PX11. PX12 in the first row respectively provide the photon detection signals to the TDCs T11, T12 in the TDC block 522, and the pixels PX21, PX22 in the second row respectively provide the photon detection signals to the TDCs T21, T22 in the TDC block 523. As the transmission of photon detection signals in the frame period Fn+1 illustrated in FIG. 5B, the pixels PX11, PX12 in the first row respectively provide the photon detection signals to the TDCs T12, T11 in the TDC block 522, and the pixels PX21, PX22 in the second row respectively provide the photon detection signals to the TDCs T22, T21 in the TDC block 523.

Figure 5C:
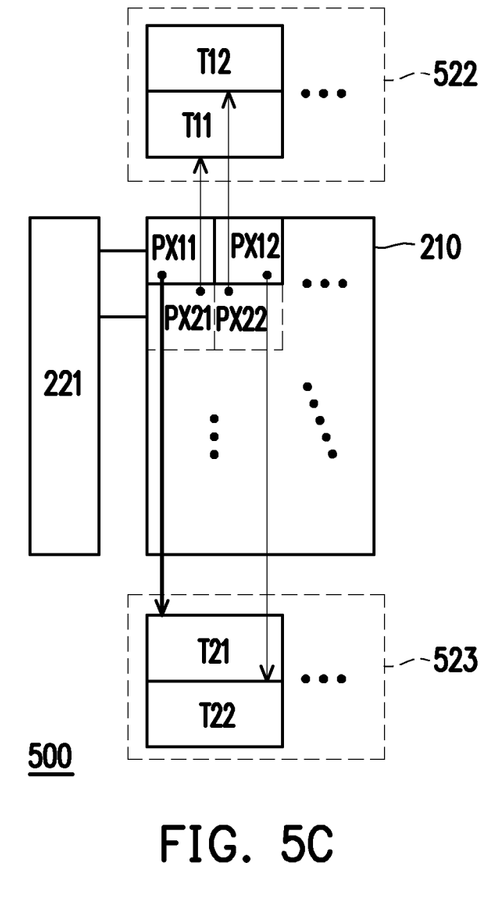
Figure 5D:
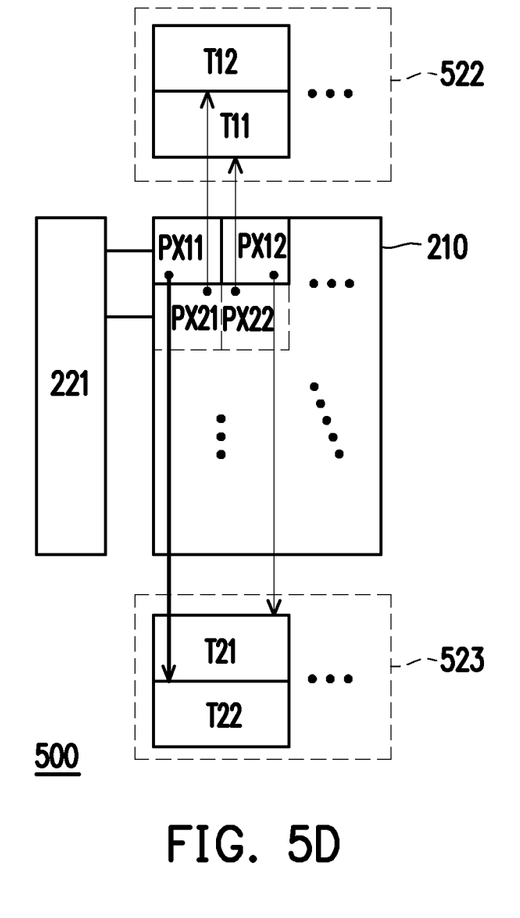

Then, as illustrated in FIGS. 5C, 5D, pixels PX11, PX12 in the first row are controlled by the row selector 221 to provide the photon detection signal to the TDC block 523, and pixels PX21, PX22 in the second row are controlled by the row selector 221 to provide the photon detection signal to the TDC block 522 in the frame periods Fn+2. Fn+3.

Specifically, as the transmission of photon detection signals in the frame period Fn+2 illustrated in FIG. 5C, the pixels PX11. PX12 in the first row respectively provide the photon detection signals to the TDCs T21, T22 in the TDC block 523, and the pixels PX21, PX22 in the second row respectively provide the photon detection signals to the TDCs T11, T12 in the TDC block 522. As the transmission of photon detection signals in the frame period Fn+3 illustrated in FIG. 5D, the pixels PX11. PX12 in the first row respectively provide the photon detection signals to the TDCs T22, T21 in the TDC block 523, and the pixels PX21, PX22 in the second row respectively provide the photon detection signals to the TDCs T12, T11 in the TDC block 522.

As a result, for each pixel, transmissions of the photon detection signals to the TDCs T11, T12, T21, T22 are performed, and a first to fourth arrival times are obtained in respective. The computing circuit 224 is capable to calculate an average time difference according to the first arrival time to the fourth arrival time. The computing circuit 224 may calculate the distance from each pixel to the object and the histogramming circuit 230 may gather calculated depth of each pixel to generate a depth image after the frame periods Fn-Fn+3.

In brief, by calculating the average time difference of the first to fourth time differences, not only offsets resulted from the signal paths can be improved, but also errors generated from variations of the TDCs T11, T12, T21, T22 can be mitigated, thereby improving accuracy of the DTOF sensor array system 500.

Figure 6:
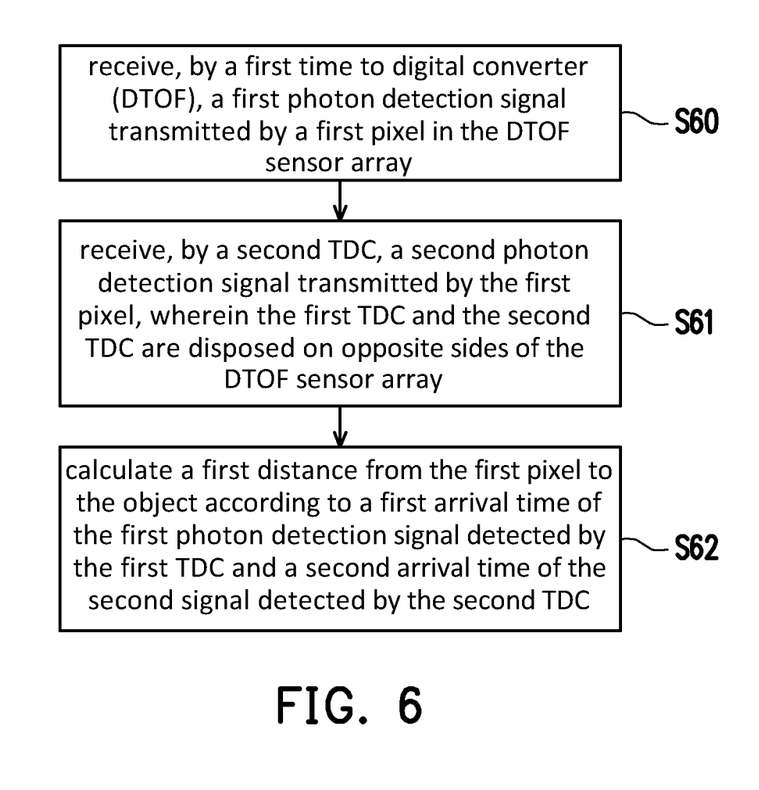
FIG. 6 illustrates a flow chart of a method for measuring a distance from a direct time of flight (DTOF) sensor array to an object in accordance with some embodiments of the present disclosure.

FIG. 6 illustrates a flow chart of a method for measuring a distance from a direct time of flight (DTOF) sensor array to an object in accordance with some embodiments of the present disclosure. The method may be implemented by the DTOF sensor array system 200/500 as illustrated in FIGS. 2A, 5A-5D. The method comprises steps S60-S62.

In step S60, a first photon detection signal transmitted by a first pixel in the DTOF sensor array is received by a first time to digital converter (DTOF).

In step S61, a second photon detection signal transmitted by the first pixel is receive, by a second TDC. It is noted that the first TDC and the second TDC are disposed on opposite sides of the DTOF sensor array 210. Since a signal paths from the first pixel to the first TDC and the second TDC are complementary, which means a total signal path from the first pixel to the first TDC and the second TDC is constant.

In step S62, a first distance from the first pixel to the object is calculated according to a first arrival time of the first photon detection signal detected by the first TDC and a second arrival time of the second signal detected by the second TDC. It is noted that the first TDC calculates a first time difference between when the modulated signal is emitted and when the photon is detected, and the second TDC calculates a second time difference between when the modulated signal is emitted and when the photon is detected. The computing circuit is configured to calculate an average time difference of the first and second time differences, and thus the first distance of the first pixel of the object may be derived according to the average time difference. Repeat the operations iteratively, distance of each pixel to the object may be obtained, and a depth image which records relative or absolute depth information of the object may be obtained.

In accordance with an embodiment, an apparatus for measuring a distance to an object includes a light source, a direct time of flight (DTOF) sensor array and a processing circuitry. The light source is configured to emit a modulated signal towards the object. The DTOF sensor array is configured to receive a reflected signal from the object, wherein the DTOF sensor array comprises a plurality of single-photon avalanche diodes (SPADs) disposed in a plurality of pixels. The processing circuitry is coupled to the DTOF sensor array and the processing circuitry includes a first time to digital converter (TDC) and a second TDC, respectively disposed on opposite sides of the DTOF sensor array. The processing circuitry configured to receive, by the first TDC, a first photon detection signal transmitted by a first pixel, receive, by the second TDC, a second photon detection signal transmitted by the first pixel, and calculate a first distance from the first pixel to the object according to a first arrival time of the first photon detection signal detected by the first TDC and a second arrival time of the second signal detected by the second TDC.

In accordance with an embodiment, a processing circuitry for processing signals received from a direct time of flight (DTOF) sensor array to calculate a distance to an object is introduced. The processing apparatus includes a first time to digital converter (TDC) and a second TDC disposed on opposite sides of the DTOF sensor array. The processing circuitry is configured to receive, by the first TDC, a first photon detection signal transmitted by a first pixel, receive, by the second TDC, a second photon detection signal transmitted by the first pixel, and calculate a first distance from the first pixel to the object according to a first arrival time of the first photon detection signal detected by the first TDC and a second arrival time of the second signal detected by the second TDC.

In accordance with an embodiment, a method for measuring a distance from a direct time of flight (DTOF) sensor array to an object is introduced. The method includes steps of receiving, by a first time to digital converter (DTOF), a first photon detection signal transmitted by a first pixel in the DTOF sensor array, receiving, by a second TDC, a second photon detection signal transmitted by the first pixel, and calculating a first distance from the first pixel to the object according to a first arrival time of the first photon detection signal detected by the first TDC and a second arrival time of the second signal detected by the second TDC. The first TDC and the second TDC are disposed on opposite sides of the DTOF sensor array.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An apparatus for measuring a distance to an object, the apparatus comprising:
   a light source configured to emit a modulated signal towards the object;
   a direct time of flight (DTOF) sensor array configured to receive a reflected signal from the object, wherein the DTOF sensor array comprises a plurality of single-photon avalanche diodes (SPADs) disposed in a plurality of pixels; and
   a processing circuitry coupled to the DTOF sensor array and comprising a first time to digital converter (TDC)

and a second TDC, respectively disposed on opposite sides of the DTOF sensor array, the processing circuitry configured to:
- receive, by the first TDC, a first photon detection signal transmitted by a first pixel;
- receive, by the second TDC, a second photon detection signal transmitted by the first pixel; and
- calculate a first distance from the first pixel to the object according to a first arrival time of the first photon detection signal detected by the first TDC and a second arrival time of the second signal detected by the second TDC.

2. The apparatus of claim 1, wherein the processing circuitry comprises a computing circuit coupled to the first TDC and the second TDC, and configured to calculate the first distance to the object by averaging the first arrival time and the second arrival time.

3. The apparatus of claim 1, wherein the first photon detection signal is transmitted from the first pixel to the first TDC during a first frame period, and the second photon detection signal is transmitted from the first pixel to the second TDC during a second frame period.

4. The apparatus of claim 3, wherein a third photon detection signal is transmitted from a second pixel adjacent to the first pixel to the first TDC during the first frame period, and a fourth photon detection signal is transmitted from the second pixel to the second TDC during the second frame period.

5. The apparatus of claim 4, wherein the first pixel and the second pixel are disposed in adjacent rows of the DTOF sensor array.

6. The apparatus of claim 1, wherein the first photon detection signal and the second photon detection signal are transmitted from the first pixel to the first TDC and second TDC during a first frame period.

7. The apparatus of claim 6, wherein during a second frame period, a second pixel adjacent to the first pixel is configured to transmit a third photon detection signal and a fourth reflected to the first TDC and the second TDC respectively.

8. The apparatus of claim 1, wherein the first TDC comprises a first sub-TDC and a second sub-TDC, the second TDC comprises a third sub-TDC and a fourth sub-TDC,
- wherein during a first frame period, the first photon detection signal is transmitted from the first pixel to the first sub-TDC;
- wherein during a second frame period, the second photon detection signal is transmitted from the first pixel to the third sub-TDC;
- wherein during a third frame period, a third photon detection signal is transmitted from the first pixel to the second sub-TDC; and
- wherein during a fourth frame period, a fourth photon detection signal is transmitted from the first pixel to the fourth sub-TDC.

9. The apparatus of claim 8, wherein during the first frame period, a fifth photon detection signal is transmitted from a second pixel adjacent to the first pixel to the third sub-TDC;
- wherein during the second frame period, a sixth photon detection signal is transmitted from the second pixel to the first sub-TDC;
- wherein during the third frame period, a seventh photon detection signal is transmitted from the second pixel to the fourth sub-TDC; and
- wherein during the fourth frame period, an eighth photon detection signal is transmitted from the second pixel to the second sub-TDC.

10. The apparatus of claim 8, wherein the first distance to the object is calculated by averaging arrival times of the first to fourth detection signals.

11. A processing circuitry for processing signals received from a direct time of flight (DTOF) sensor array to calculate a distance to an object, the processing apparatus comprising:
- a first time to digital converter (TDC) and a second TDC disposed on opposite sides of the DTOF sensor array, wherein processing circuitry is configured to perform:
  - receive, by the first TDC, a first photon detection signal transmitted by a first pixel;
  - receive, by the second TDC, a second photon detection signal transmitted by the first pixel; and
  - calculate a first distance from the first pixel to the object according to a first arrival time of the first photon detection signal detected by the first TDC and a second arrival time of the second signal detected by the second TDC.

12. The processing circuitry of claim 11, wherein the processing circuitry comprises a computing circuit coupled to the first TDC and the second TDC, and configured to calculate the first distance to the object by averaging the first arrival time and the second arrival time.

13. The processing circuitry of claim 11, wherein the first photon detection signal is transmitted from the first pixel to the first TDC during a first frame period, and the second photon detection signal is transmitted from the first pixel to the second TDC during a second frame period.

14. The processing circuitry of claim 13, wherein a third photon detection signal is transmitted from a second pixel adjacent to the first pixel to the first TDC during the first frame period, and a fourth photon detection signal is transmitted from the second pixel to the second TDC during the second frame period.

15. The processing circuitry of claim 11, wherein the first photon detection signal and the second photon detection signal are transmitted from the first pixel to the first TDC and second TDC during a first frame period.

16. The processing circuitry of claim 15, wherein during a second frame period, a second pixel adjacent to the first pixel is configured to transmit a third photon detection signal and a fourth reflected to the first TDC and the second TDC respectively.

17. The processing circuitry of claim 11, wherein the first TDC comprises a first sub-TDC and a second sub-TDC, the second TDC comprises a third sub-TDC and a fourth sub-TDC,
- wherein during a first frame period, the first photon detection signal is transmitted from the first pixel to the first sub-TDC;
- wherein during a second frame period, the second photon detection signal is transmitted from the first pixel to the third sub-TDC;
- wherein during a third frame period, a third photon detection signal is transmitted from the first pixel to the second sub-TDC; and
- wherein during a fourth frame period, a fourth photon detection signal is transmitted from the first pixel to the fourth sub-TDC.

18. The processing circuitry of claim 17, wherein during the first frame period, a fifth photon detection signal is transmitted from a second pixel adjacent to the first pixel to the third sub-TDC;

wherein during the second frame period, a sixth photon detection signal is transmitted from the second pixel to the first sub-TDC;

wherein during the third frame period, a seventh photon detection signal is transmitted from the second pixel to the fourth sub-TDC; and wherein during the fourth frame period, an eighth photon detection signal is transmitted from the second pixel to the second sub-TDC.

19. The processing circuitry of claim 18, wherein the first distance to the object is calculated by averaging arrival times of the first to fourth detection signals.

20. A method for measuring a distance from a direct time of flight (DTOF) sensor array to an object, the method comprising:

receive, by a first time to digital converter (TDC), a first photon detection signal transmitted by a first pixel in the DTOF sensor array;

receive, by a second TDC, a second photon detection signal transmitted by the first pixel;

and calculate a first distance from the first pixel to the object according to a first arrival time of the first photon detection signal detected by the first TDC and a second arrival time of the second signal detected by the second TDC, wherein the first TDC and the second TDC are disposed on opposite sides of the DTOF sensor array.

* * * * *